US012658782B2

(12) United States Patent
Schneider et al.

(10) Patent No.: US 12,658,782 B2
(45) Date of Patent: Jun. 16, 2026

(54) REDUNDANT INTERRUPT FOR CIRCUIT ARRANGEMENT AND ELECTRICAL SYSTEM

(71) Applicant: Robert Bosch GmbH, Stuttgart (DE)

(72) Inventors: Joerg Schneider, Ludwigsburg (DE); Johannes Swoboda, Stuttgart (DE); Thomas Schaedlich, Kornwestheim (DE); Thomas Barabas, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 18/434,079

(22) Filed: Feb. 6, 2024

(65) Prior Publication Data

US 2024/0275264 A1     Aug. 15, 2024

(30) Foreign Application Priority Data

Feb. 15, 2023     (DE) ..................... 10 2023 201 258.8

(51) Int. Cl.
H02M 1/08          (2006.01)
H02H 3/02          (2006.01)
          (Continued)
(52) U.S. Cl.
CPC .............. H02M 1/08 (2013.01); H02H 3/023 (2013.01); H02H 3/027 (2013.01); H02H 3/05 (2013.01); H02H 3/24 (2013.01); H02H 5/041 (2013.01)
(58) Field of Classification Search
CPC ......... H02M 1/08; H02H 3/023; H02H 3/027; H02H 3/05; H02H 3/24; H02H 5/041;
          (Continued)

(56) References Cited

U.S. PATENT DOCUMENTS 6,717,785 B2 *   4/2004   Fukuda .............. H03K 17/0828
                                              361/86
10,855,271 B2 *  12/2020  Imasato ........... H03K 17/08122
                          (Continued)

FOREIGN PATENT DOCUMENTS

DE        102015211625 A1    12/2016
EP            0398026 A2    11/1990
                (Continued)

*Primary Examiner* — Monica Lewis

*Assistant Examiner* — Nicolas Bellido

(74) *Attorney, Agent, or Firm* — Michael Best & Friedrich LLP

(57)          ABSTRACT

A circuit arrangement and an electrical system that includes a semiconductor switch (10), a gate driver (20), a power supply (30), a control unit (40), a monitoring unit (50) and a shutdown device (60). The semiconductor switch (10) is configured to be arranged in a circuit including a power source (70) and a load (80), and to close and interrupt the circuit as a function of a control of a gate connection (12) of the semiconductor switch (10). The power supply (30) powers the gate driver (20). The control unit (40) controls the gate driver (20) to open and close the semiconductor switch (10). The monitoring unit (50) determines a request for the redundant interruption of the circuit based on predefined criteria. The shutdown device (60) shuts down a gate voltage applied to the gate connection (12) in response to a request for the redundant interruption of the circuit.

16 Claims, 2 Drawing Sheets

(51) Int. Cl.
  *H02H 3/027*        (2006.01)
  *H02H 3/05*         (2006.01)
  *H02H 3/24*         (2006.01)
  *H02H 5/04*         (2006.01)
(58) Field of Classification Search
  CPC .......... H02H 3/08; H02H 7/18; H03K 17/687;
                                    H03K 17/567
  See application file for complete search history.

(56)                    References Cited

U.S. PATENT DOCUMENTS

2008/0151454  A1 *   6/2008  Uhl ...................... B60R 21/017
                                                      361/87
2012/0242376  A1 *   9/2012  Ose ................... H03K 17/0828
                                                      327/109
2016/0099665  A1 *   4/2016  Chen ................. H02M 7/53871
                                                      363/56.02
2017/0079094  A1 *   3/2017  Okita ........................ H02J 7/68
2020/0083881  A1     3/2020  Imasato et al.

FOREIGN PATENT DOCUMENTS

EP          1600337  B1    12/2007
EP          2131497  A1 *  12/2009   ......... H03K 17/0822

* cited by examiner

REDUNDANT INTERRUPT FOR CIRCUIT ARRANGEMENT AND ELECTRICAL SYSTEM

BACKGROUND

The present invention relates to a circuit arrangement and electrical system comprising such a circuit arrangement.

From the prior art, electrical systems are known, for example, on-board power supplies of battery-electrically operated vehicles, in which a redundant shutdown of an electrical load is required due to requirements for functional safety (e.g., in accordance with ISO26262, etc.).

It is also known to use electromechanical switches, such as contactors, for such a redundant shutdown.

EP 2 131 497 B1 describes semiconductor switches for switching a load current of an electrical consumer, in particular semiconductor switches, with an integrated monitoring circuit for protection against overcurrent and short circuit.

EP 1 600 337 B1 describes a semiconductor switch used in a battery circuit breaker for a motor vehicle, which allows a safe and reversible separation of a vehicle on-board power supply from a battery of the motor vehicle.

SUMMARY

According to a first aspect of the present invention, a circuit arrangement is proposed comprising at least one semiconductor switch, a gate driver, a power supply, a control unit, a monitoring unit and a shutdown device.

It should generally be noted that the semiconductor switch can be a single semiconductor switch or a parallel circuit of a plurality of semiconductor switches, wherein a parallel circuit of a plurality of semiconductor switches can be used, for example, advantageously for switching high powers. Further, the semiconductor switch is preferably configured as a self-locking semiconductor switch.

For example, the control unit and/or the monitoring unit and/or the shutdown device are each configured as an ASIC, FPGA, processor, digital signal processor, microcontroller, or the like, without thereby being limited to such a configuration.

The semiconductor switch is configured to be arranged in a circuit from a power source (e.g., a battery, in particular, a secondary battery, etc.) and a load (e.g., an inverter for an electric motor, an electric motor, etc.) and to close and interrupt the circuit as a function of a control of the gate connection of the semiconductor switch by the gate driver. The control by the gate driver represents a primary or regular shutdown path of the circuit arrangement, which ensures that the load is disconnected from the power source in the absence of any fault conditions (e.g. when the load is not in use).

The power supply, which can in principle be configured as desired, is provided at least for supplying the gate driver, but it can also be used to supply further components of the circuit arrangement according to the invention.

The control unit is configured to control the gate driver to open and close the semiconductor switch, for example, in accordance with an activation and/or deactivation request from a superordinate system and/or in accordance with a user request (e.g., to start and/or deactivate a vehicle) and/or in accordance with requests other than this. The gate driver is controlled by the control unit, for example, based on a signal output by the control unit to the gate driver.

The monitoring unit is configured to determine a request for the redundant interruption of the circuit based on predefined criteria. The determination is carried out on the basis of sensor technology, which is connected to the monitoring unit in terms of information technology and which is configured to monitor variables relevant for a redundant interruption of the circuit (which are explained in more detail in the course of the description of the sub-claims). Alternatively or additionally, it is also possible to determine a request for the redundant interruption of the circuit based on any input signals that are provided to the monitoring unit, for example by components outside the circuit arrangement.

The shutdown device is configured to switch off a gate voltage applied to the gate connection of the semiconductor switch in response to a present request for the redundant interruption of the circuit independent of a current control of the gate driver by the control unit, such that an interruption of the circuit is effected by the semiconductor switch. For this purpose, the shutdown device is advantageously connected to the monitoring unit in terms of information technology in order to transmit the request for the redundant interruption of the circuit determined by the monitoring unit to the shutdown device.

The shutdown device thus represents a secondary or redundant shutdown path, at least in conjunction with the monitoring unit, which ensures an interruption of the circuit as an alternative or in addition to the primary shutdown path.

Accordingly, the circuit arrangement according to the invention offers the advantage that a redundant interruption of a circuit is made possible purely on the basis of the semiconductor switch without an additional arrangement of redundant switches such as contactors, relays, etc., so that safety-critical requirements for such a circuit can in particular be implemented with a particularly low circuit complexity and at particularly low cost.

The dependent claims disclose preferred embodiments of the invention.

In an advantageous embodiment of the present invention, the semiconductor switch is a MOSFET, particularly a power MOSFET, and preferably a SiC MOSFET and/or a GaN MOSFET and/or an IGBT. It should be noted that the present description refers to a MOSFET as a substitute with regard to the designation of the connections of the semiconductor switch and that corresponding designations of the connections of an IGBT are not explained in more detail, since it can be seen by the person skilled in the art how the use of an IGBT instead of a MOSFET is to be implemented within the circuit arrangement according to the invention.

In a further advantageous embodiment of the present invention, the shutdown device comprises a first switch (e.g., a semiconductor switch and/or an electromechanical switch, such as a relay, etc.), which is connected between the gate connection and a source connection of the semiconductor switch and which is in an open state in the absence of a request for the redundant interruption of the circuit. In addition, the shutdown device is configured to close the first switch in response to a request for the redundant interruption of the circuit, such that the gate voltage is switched off due to a short circuit between the source connection and the gate connection.

In a further advantageous embodiment of the present invention, the shutdown device comprises a second switch (e.g., a semiconductor switch and/or an electromechanical switch, such as a relay, etc.), which is connected between a supply connection of the gate driver and a connection of the power supply and/or is arranged to deactivate the power supply in an open state of the second switch, and which is in a closed state in the absence of a request for the redundant interruption of the circuit. In addition, the shutdown device is configured to open the second switch in response to a request for the redundant interruption of the circuit, such that the gate voltage is switched off due to an interruption of the power supply for the gate driver.

Particularly advantageous, the criteria for determining a request for redundant interruption of the circuit include falling below a predefined voltage threshold by the voltage supply (i.e., an undervoltage detection) and/or exceeding a predefined current threshold by a current flowing in the circuit (i.e., an overcurrent detection) and/or a component exceeding a predefined temperature threshold, in particular by the semiconductor switch of the circuit arrangement, to prevent damage to the semiconductor switch due to an overcurrent and/or an impermissibly high temperature, for example. Alternatively or additionally, the criteria include a deviation of a target switching state of the semiconductor switch from an actual switching state of the semiconductor switch (which may result, for example, from a faulty control of the gate driver and/or from a fault within the gate driver) and/or a present fault state of the power source (e.g., an undervoltage present in the power source and/or an overvoltage and/or an impermissibly high temperature of cells of a power source designed as a battery etc.). Further alternatively or additionally, the criteria include achieving a predefined fault state and/or a predefined operating state of a superordinate system using the circuit arrangement. In an exemplary case where the superordinate system using the circuit arrangement is a vehicle and/or an on-board power supply of such a vehicle, a predefined fault state may be detected, for example, in the event of an accident of the vehicle and/or a failure of the on-board power supply of the vehicle, etc. For example, a predefined operating state using the example of a vehicle can be a parking state of the vehicle in which, for safety reasons, a battery of the vehicle is to be additionally disconnected from consumers of the vehicle for safety reasons or similar by means of the redundant disconnection path by means of the circuit arrangement according to the invention.

Further advantageously, the semiconductor switch of the circuit arrangement according to the invention is a first semiconductor switch, while the circuit arrangement comprises at least one second semiconductor switch, which is connected to the first semiconductor switch anti-serially (also known as a "back-to-back" arrangement). The circuit arrangement is configured to control the first semiconductor switch and the second semiconductor switch separately and/or together to interrupt and close the circuit. It should be noted that the second semiconductor switch, like the first semiconductor switch, may be a single semiconductor switch or a parallel circuit of a plurality of semiconductor switches. The anti-serial arrangement of the semiconductor switches allows bi-directional interruption of the circuit, i.e., in both possible flow directions of a current in the circuit, in an event where an existing body diode of the semiconductor switch allows only one-sided blocking of the current by means of a single semiconductor switch. For example, the first semiconductor switch and the second semiconductor switch are controlled by the same power supply and/or by the same control unit and/or by the same gate driver. Alternatively, it is also conceivable that the two semiconductor switches are only controlled and/or supplied by a part of the aforementioned control components and/or by fully separate configured control components. This also applies analogously to the monitoring unit and/or the shutdown device, which may be configured at least partially together or entirely separately for the respective semiconductor switch.

In a further advantageous embodiment of the present invention, the shutdown device and/or the monitoring unit and/or the control unit are integrated together and are in particular integrated into the gate driver. For example, in a partially or fully integrated state of the aforementioned components, it is advantageously possible to implement their respective underlying logics using a single or a reduced number of computational units.

Moreover, it is conceivable that the circuit arrangement is configured to perform the redundant interruption of the circuit in a predefined time interval after control for the semiconductor switch to be opened by the control unit. By maintaining the predefined time interval, a further diagnosis of a present fault state of the circuit arrangement and/or the superordinate system can first be carried out prior to the redundant shutdown by the circuit arrangement, for example, and can be considered in the course of a fault handling action.

According to a second aspect of the present invention, an electrical system is proposed, which comprises a power source (e.g., a battery), a load (e.g., an electric motor and/or inverter, etc.), and a circuit arrangement according to one of the preceding claims. The features, feature combinations, and the advantages resulting hereby correspond to those described in connection with the aspect of the invention specified in the introductory section clearly enough that reference is made to the descriptions hereinabove in order to avoid repetition.

Preferably, the electrical system is an on-board power supply of a vehicle, without thereby being limited to such a configuration. Alternatively or additionally, the circuit arrangement is configured to be used in an electrical system that uses voltages of up to 12 V, preferably up to 48 V, and further preferably up to 800 V.

BRIEF DESCRIPTION OF THE DRAWINGS

Exemplary embodiments of the invention are described in detail below with reference to the accompanying drawing. The figures show.

DETAILED DESCRIPTION

Figure 1:
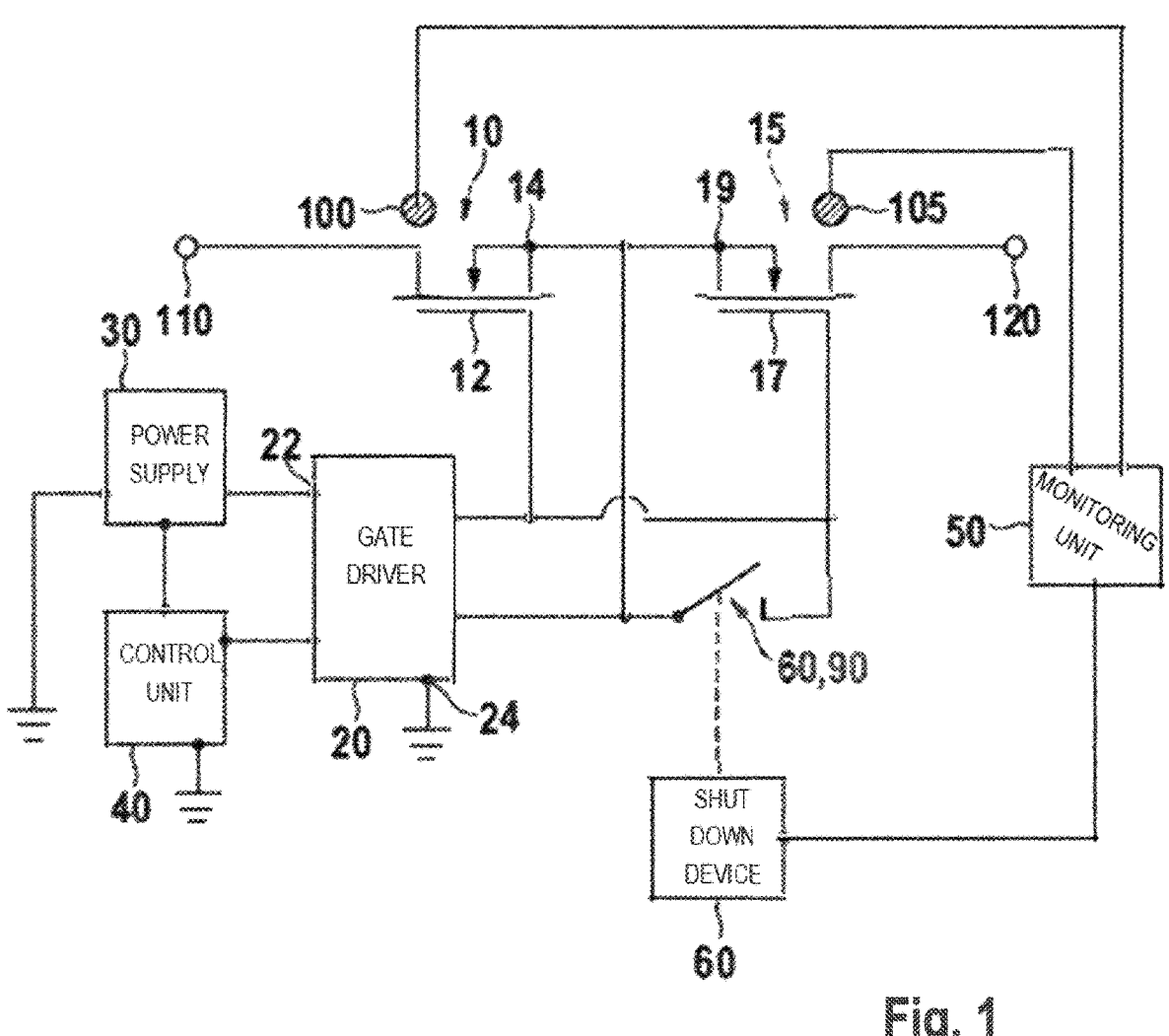
FIG. 1 a circuit diagram of a circuit arrangement according to the invention in a first embodiment.

FIG. 1 shows a circuit diagram of a circuit arrangement according to the invention in a first embodiment.

The circuit arrangement comprises a first self-locking semiconductor switch 10 and a second self-locking semiconductor switch 15 arranged in a back-to-back configuration. The semiconductor switches 10, 15 are each configured as GaN MOSFETs herein.

The circuit arrangement further comprises a gate driver 20, a power supply 30, a control unit 40, a monitoring unit 50 and a shutdown device 60, a first connection 110 and a second connection 120.

The two semiconductor switches 10 are configured via the first connection 110 and the second connector 120 to be arranged in a circuit consisting of a power source (not shown) and a load (not shown) and to close and interrupt the circuit as a function of a control of respective gate connections 12, 17 of the semiconductor switches 10, 15 by the gate driver 20.

The power supply 30 is provided for supplying the gate driver 20 and the control unit 40, and the control unit 40 is configured to control the gate driver 20 to open and close the semiconductor switches 10, 15. The gate driver 20 is supplied via a first supply connection 22 and a second supply connection 24 of the gate driver 20, wherein the second supply connection 24 is at a ground potential of the circuit arrangement.

The monitoring unit 50 is configured to determine a request for the redundant interruption the circuit, wherein the determination is carried out here based on a first temperature sensor 100 measuring the first semiconductor switch 10 and based on a second temperature sensor 105 measuring the second semiconductor switch 15. The request for the redundant interruption of the circuit is determined in such cases by the monitoring unit 50 in which respective temperatures of the first semiconductor switch 10 and/or the second semiconductor switch 15 measured by the temperature sensors 100, 105 exceed a predefined temperature threshold.

Alternatively or additionally, a request for redundant interruption of the circuit is generated in a case in which a superordinate electrical system (not shown) using the circuit arrangement has a fault state and transmits this fault state to the monitoring unit 50 by means of an information technology connection between the electrical system and the monitoring unit 50.

The shutdown device 60 is configured to switch off a gate voltage present at the respective gate connections 12, 17 of the semiconductor switches 10, 15 in response to a present request for redundant interruption of the circuit independent of a current control of the gate driver 20 by the control unit 40, such that a bidirectional interruption of the circuit is effected by the semiconductor switches 10, 15 due to the back-to-back configuration of the semiconductor switches 10, 15.

For this purpose, the shutdown device 60 comprises a first switch 90 configured as a Si semiconductor switch, which is connected between the respective gate connections 12, 17 and the respective source connections 14, 19 of the first semiconductor switch 10 and the second semiconductor switch 15. In the absence of a request for the redundant interruption of the circuit, the first switch 90 is in an open state.

Based on the configuration described above, the shutdown device is configured to close the first switch 90 in response to a determined request for the redundant interruption of the circuit, such that the gate voltages present at the two semiconductor switches 10, 15 are disconnected due to a short circuit between the gate connection 12 and the source connection 14 of the first semiconductor switch 10, and due to a short circuit between the gate connection 17 and the source connection 19 of the second semiconductor switch 15.

Advantageously, it is possible that the monitoring unit 50 and/or the shutdown device 60 and/or the control unit 40 and/or the gate driver 20 are integrated together or at least in part, e.g. in one or more ASICs.

Figure 2:
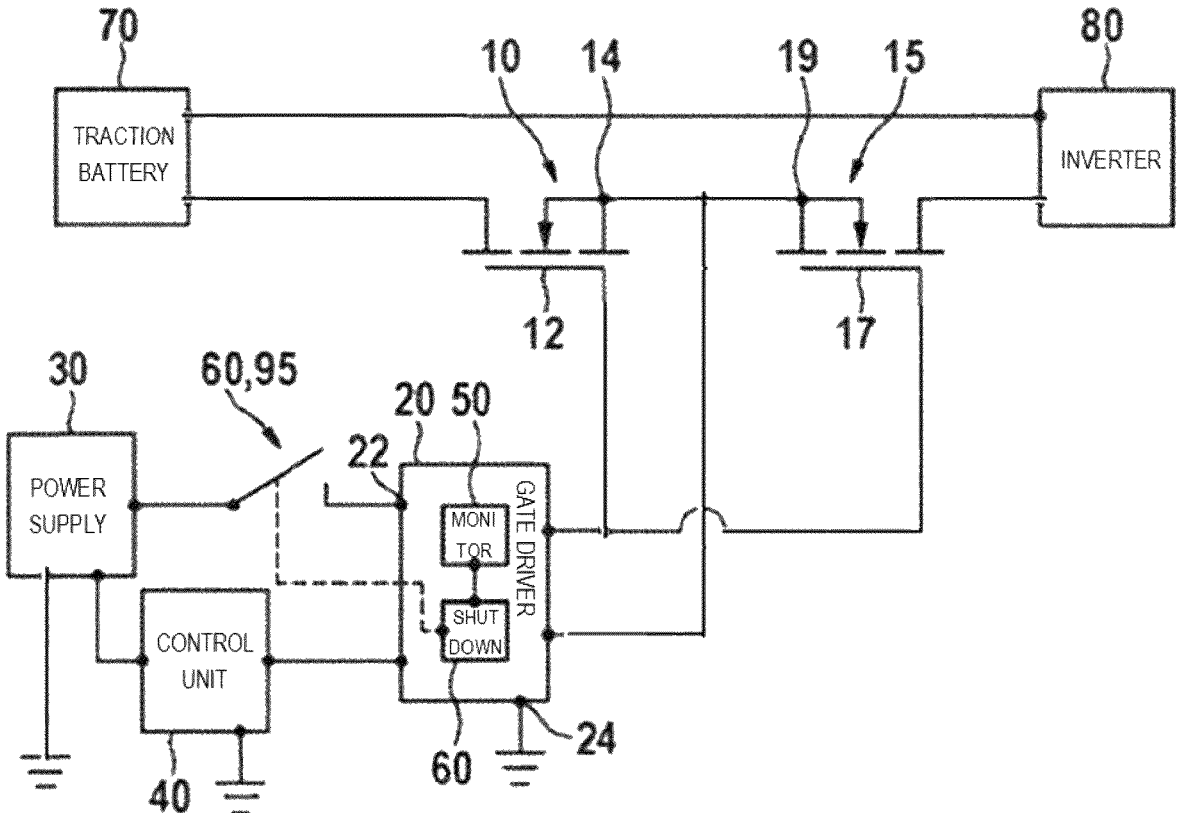
FIG. 2 a circuit diagram of an electrical system according to the invention comprising a circuit arrangement according to the invention in a second embodiment.

FIG. 2 shows a circuit diagram of an electrical system according to the invention comprising a circuit arrangement according to the invention in a second embodiment.

It should be noted that due to similarities between the first embodiment shown in FIG. 1 and the second embodiment shown in FIG. 2, in order to avoid repetition, essentially only the differences between the two figures are described below and otherwise reference is made to the description of FIG. 1.

FIG. 2 shows an electrical system configured as an on-board power supply of a vehicle, which includes a circuit consisting of a traction battery 70, which is configured to provide a voltage of 400 V, an inverter 80 of the vehicle and the circuit arrangement according to the invention according to the second embodiment.

The two semiconductor switches 10, 15, which are also arranged here in a back-to-back configuration for bi-directional switching of the circuit, are connected directly to the gate driver 20 without an intermediary first switch 90 via their respective gate connections 12, 17 and their respective source connections 14, 19, as shown in FIG. 1. It should be noted that the first switch 90 and its circuitry, as in FIG. 1, can of course additionally be used here in the second embodiment.

Instead of the first switch 90, the second embodiment comprises a second switch 95, which is also configured here as a Si semiconductor switch. The second switch 95 is a component of the shutdown device 60, which is integrated into the gate driver 20 here, like the monitoring unit 50.

The monitoring unit 50 is configured to monitor a supply voltage provided by the power supply 30, which is provided to the gate driver 20 via the first connection 110 and the second connection 120. For this purpose, the monitoring unit 50 is configured to generate a request for a redundant interruption of the circuit when the supply voltage falls below a predefined voltage threshold.

The monitoring unit 50 is further configured to transmit the request for the redundantly interruption of the circuit to the shutdown device 60, such that the shutdown device 60 can cause the second switch 95 to open to cause the redundant interruption of the circuit by the associated interruption of the supply voltage. The interruption is ensured in that the semiconductor switches 10, 15 are also configured as self-locking semiconductor switches here.

The invention claimed is:

1. A circuit arrangement comprising:
at least one semiconductor switch (10),
a gate driver (20),
a power supply (30),
a control unit (40),
a monitoring unit (50), and
a shutdown device (60),
wherein
the semiconductor switch (10) is configured
to be arranged in a circuit consisting of a power source (70) and a load (80),
to close and interrupt the circuit as a function of a control of a gate connection (12) of the semiconductor switch (10) by the gate driver (20),
the power supply (30) is provided for supplying the gate driver (20),
the control unit (40) is configured to control the gate driver (20) to open and close the semiconductor switch (10),
the monitoring unit (50) is configured to determine a request for a redundant interruption of the circuit based on predefined criteria, and
the shutdown device (60) is configured to shut down a gate voltage applied to the gate connection (12) of the semiconductor switch (10) in response to the request for the redundant interruption of the circuit independent of a current control of the gate driver (20) by the control unit (40), such that an interruption of the circuit is effected by the semiconductor switch (10), and wherein the shutdown device (60)

comprises a first switch (90) being connected between the gate connection (12) and a source connection (14) of the semiconductor switch (10) and being in an open state in the absence of the request for the redundant interruption of the circuit, and is configured to close the first switch (90) in response to the request for the redundant interruption of the circuit, such that the gate voltage is switched off due to a short circuit between the source connection (14) and the gate connection (12).

2. The circuit arrangement according to claim 1, wherein the at least one semiconductor switch (10) is a MOSFET or an IGBT.

3. The circuit arrangement according to claim 1, wherein the predefined criteria for determining the request for the redundant interruption of the circuit include falling below a predefined voltage threshold by the power supply (30), and/or exceeding a predefined current threshold through a current flowing in the circuit, and/or a component exceeding a predefined temperature threshold, and/or a deviation of a target switching state of the semiconductor switch (10) from an actual switching state of the semiconductor switch (10), and/or a present fault state of the power source (70), and/or achieving a predefined fault state and/or a predefined operating state of a superordinate system using the circuit arrangement.

4. The circuit arrangement according to claim 1, wherein the at least one semiconductor switch (10) is a first semiconductor switch (10), the circuit arrangement comprises at least one second semiconductor switch (15) being switched anti-serially to the first semiconductor switch (10), and the circuit arrangement is configured to control the first semiconductor switch (10) and the second semiconductor switch (15) separately and/or together to interrupt and close the circuit.

5. The circuit arrangement according to claim 1, wherein the shutdown device (60) and/or the monitoring unit (50) and/or the control unit (40) are integrated into the gate driver (20).

6. The circuit arrangement according to claim 1, wherein the circuit arrangement is configured to perform the redundant interruption of the circuit in a predefined time interval after control for the at least one semiconductor switch (10) to be opened by the control unit (40).

7. An electrical system comprising the power source (70), the load (80), and the circuit arrangement according to claim 1.

8. The electrical system according to claim 7, wherein the electrical system is an on-board power supply of a vehicle, and/or the circuit arrangement is configured to be used in an electrical system that uses voltages of up to 800 V.

9. A circuit arrangement comprising:

at least one semiconductor switch (10), a gate driver (20), a power supply (30), a control unit (40), a monitoring unit (50), and a shutdown device (60), wherein the semiconductor switch (10) is configured to be arranged in a circuit consisting of a power source (70) and a load (80), to close and interrupt the circuit as a function of a control of a gate connection (12) of the semiconductor switch (10) by the gate driver (20), the power supply (30) is provided for supplying the gate driver (20), the control unit (40) is configured to control the gate driver (20) to open and close the semiconductor switch (10), the monitoring unit (50) is configured to determine a request for a redundant interruption of the circuit based on predefined criteria, and the shutdown device (60) is configured to shut down a gate voltage applied to the gate connection (12) of the semiconductor switch (10) in response to the request for the redundant interruption of the circuit independent of a current control of the gate driver (20) by the control unit (40), such that an interruption of the circuit is effected by the semiconductor switch (10), and wherein the shutdown device (60) comprises a second switch (95) connected between a supply connection (22, 24) of the gate driver (20) and a connection of the power supply (30) and/or is configured to deactivate the power supply, and which is in a closed state in the absence of the request for the redundant interruption of the circuit, and is configured to open the second switch (95) in response to the request for the redundant interruption of the circuit, such that the gate voltage is switched off due to an interruption of the power supply (30) for the gate driver (20).

10. The circuit arrangement according to claim 9, wherein the at least one semiconductor switch (10) is a MOSFET or an IGBT.

11. The circuit arrangement according to claim 9, wherein the predetermined criteria for determining the request for the redundant interruption of the circuit include falling below a predefined voltage threshold by the power supply (30), and/or exceeding a predefined current threshold through a current flowing in the circuit, and/or a component exceeding a predefined temperature threshold, and/or a deviation of a target switching state of the semiconductor switch (10) from an actual switching state of the semiconductor switch (10), and/or a present fault state of the power source (70), and/or achieving a predefined fault state and/or a predefined operating state of a superordinate system using the circuit arrangement.

12. The circuit arrangement according to claim 9, wherein the at least one semiconductor switch (10) is a first semiconductor switch (10), the circuit arrangement comprises at least one second semiconductor switch (15) being switched anti-serially to the first semiconductor switch (10), and the circuit arrangement is configured to control the first semiconductor switch (10) and the second semiconductor switch (15) separately and/or together to interrupt and close the circuit.

13. The circuit arrangement according to claim 9, wherein the shutdown device (60) and/or the monitoring unit (50) and/or the control unit (40) are integrated into the gate driver (20).

14. The circuit arrangement according to claim 9, wherein the circuit arrangement is configured to perform the redundant interruption of the circuit in a predefined time interval after control for the at least one semiconductor switch to be opened by the control unit (40).

15. An electrical system comprising the power source (70), the load (80), and the circuit arrangement according to claim 9.

16. The electrical system according to claim 15, wherein the electrical system is an on-board power supply of a
   vehicle, and/or the circuit arrangement is configured to be used in an
   electrical system that uses voltages of up to 800 V.

\* \* \* \* \*